United States Patent [19]

Durr et al.

[11] Patent Number: 5,335,504
[45] Date of Patent: Aug. 9, 1994

[54] CARBON DIOXIDE RECOVERY PROCESS

[75] Inventors: Charles A. Durr, Houston, Tex.; David B. Manley, Rolla, Mo.; Robert L. McKee, Houston, Tex.

[73] Assignee: The M. W. Kellogg Company, Houston, Tex.

[21] Appl. No.: 26,937

[22] Filed: Mar. 5, 1993

[51] Int. Cl.$^5$ ............................................. F25J 3/00
[52] U.S. Cl. ......................................... 62/20; 62/28
[58] Field of Search ..................... 62/20, 24, 27, 28

[56] References Cited

U.S. PATENT DOCUMENTS

| | | | |
|---|---|---|---|
| 3,058,893 | 10/1962 | Cahn et al. | 202/40 |
| 4,185,978 | 1/1980 | McGalliard et al. | 62/28 |
| 4,311,495 | 1/1982 | Styring, Jr. | 62/28 |
| 4,318,723 | 3/1982 | Holmes et al. | 62/20 |
| 4,370,156 | 1/1983 | Goddin, Jr. et al. | 62/17 |
| 4,383,842 | 5/1983 | O'Brien | 62/20 |
| 4,419,188 | 12/1983 | McCall | 203/24 |
| 4,428,759 | 1/1984 | Ryan et al. | 62/17 |
| 4,459,142 | 7/1984 | Goddin, Jr. | 62/20 |
| 4,595,404 | 6/1986 | Ozero et al. | 62/18 |
| 4,695,304 | 9/1987 | Sapper | 62/32 |
| 4,710,213 | 12/1987 | Sapper et al. | 62/28 |

OTHER PUBLICATIONS

*Hydrocarbon Processing*, May 1982, pp. 131–136.
*Oil and Gas Journal*, Jun. 27, 1983, pp. 85–91.
*Chemical Engineering Process*, pp. 53–56, Oct. 1984.
"The Mitchell Alvard South CO$_2$ Plants", McCann et al., Paper 74A, A.I.Ch.E. 1987 Spring National Meeting, Houston, Tex., Mar. 29–Apr. 2, 1987.

*Primary Examiner*—Ronald C. Capossela
*Attorney, Agent, or Firm*—John P. Ward

[57] ABSTRACT

A process for recovering CO$_2$ from a mixture of light hydrocarbons, e.g. light hydrocarbons produced from a CO$_2$ injection enhanced oil recovery. The mixture is distilled in a distributive zone with CO$_2$ produced overhead and in the bottoms. The overhead and bottoms produced from the distributive zone are then fed to first and second concentrating distillation zones, respectively. The first concentrating zone produces a bottoms product rich in CO$_2$ and an overhead product rich in methane and lean in CO$_2$. The second concentrating zone is refluxed with lean oil and produces a CO$_2$ distillate and a CO$_2$-lean bottoms product. In various embodiments, at least a section of each of the concentrating zones are placed in a single column, the CO$_2$ product streams are taken as a side draw, vapor from the first concentrating zone is used in an open cycle heat pump to heat the second concentrating zone, the distributive zone is thermally coupled with one or both of the concentrating zones, and the distributive zone and certain sections of the concentrating zones are physically integrated into a single column.

22 Claims, 7 Drawing Sheets

CARBON DIOXIDE RECOVERY PROCESS

FIELD OF THE INVENTION

The present invention relates to a process for separating carbon dioxide from light hydrocarbons. More particularly, the present invention relates to a carbon dioxide recovery process using $CO_2$ distributive distillation to achieve energy and capital equipment savings.

BACKGROUND OF THE INVENTION

The use of carbon dioxide in enhanced oilfield recovery (EOR) techniques has resulted in the production of light hydrocarbon gas mixtures which have a high $CO_2$ concentration. Consequently, a need has arisen to separate the hydrocarbon products and to recover the $CO_2$ for EOR reinjection.

Based on volatility differences, the separation of methane from $CO_2$ should be relatively easy. At typical demethanizer conditions, the relative volatility of methane: carbon dioxide is 5:1. However, $CO_2$ co-exists in vapor and solid phases in some regions of the column if the $CO_2$ concentration is sufficiently high. Solid $CO_2$ can plug the column.

The distillation of ethane from $CO_2$ is also limited by the formation of an azeotrope at an approximate composition of 67 percent $CO_2$ and 33 percent ethane. In addition, the azeotrope does not significantly change in composition with different operating pressures. Similarly propane is difficult to separate from $CO_2$ because the relative volatility difference is small. Thus, solvents are often used to enhance separation efficiency.

One distillation method known as the Ryan/Holmes process is disclosed in U.S. Pat. No. 4,318,723 to Holmes et al. This patent describes the distillation of acid gases from methane using a non-polar addition such as $C_2$–$C_5$ alkanes which are said to prevent solids formation in the distillation column. For additional discussion of the Ryan/Holmes process, see Holmes et al., *Hydrocarbon Processing*, May 1982, pp. 131–136; and *Oil and Gas Journal*, Jun. 27, 1983, pp. 85–91.

U.S. Pat. No. 4,383,842 to O'Brian describes a process similar to the above Ryan/Holmes process. By increasing the amount of non-polar additive used, an upper portion of a distillation column is said to be operated at a temperature above the triple point of carbon dioxide while still effecting separation of methane from $CO_2$.

U.S. Pat. No. 4,428,759 to Ryan et al. describes a Ryan/Holmes process wherein a non-polar, solidspreventing additive is taken from a bottoms product of a depropanizer distillation column.

Ryan et al., *Chemical Engineering Progress*, pp. 53–56, October, 1984, describes a four-column Ryan/Holmes process, wherein $CO_2$ is split from ethane in a first column and the overhead $CO_2$ product is recovered as a liquid product in a second column. The second column overhead containing both $CO_2$ and methane is directed to a demethanizer column. A solids-preventing additive is used to enhance the methane and ethane separations and is recovered in a fourth column. See also McCann et al., "The Mitchell Alvard South $CO_2$ Plants", "Paper 74A, A.I.Ch.E. 1987 Spring National Meeting, Houston, Tex. Mar. 29–Apr. 2, 1987.

A schematic flow sheet of a four-column, commercially installed Ryan/Holmes process adapted from McCann et al., is seen in FIG. 1. Briefly, a hydrocarbon gas mixture made up primarily of $CO_2$ and methane is directed in a line 100 to a $CO_2$ stripping column 102. $C_{1-2}$ gases are distilled, in the presence of a lean oil additive introduced from stream 104, into overhead stream 106. $C_{3+}$ hydrocarbons are removed as bottoms stream 108. The overhead stream 106 is partially condensed, and the remaining vapor is compressed into stream 110 and fed to $CO_2$ recovery tower 112. A methane rich gas stream 114 containing on the order of 29 mole percent $CO_2$ is taken overhead and partially condensed and refluxed. A $CO_2$rich bottoms stream 116 is produced. Methane rich vapor stream 118 is introduced to a demethanizer tower 120. A lean oil additive stream 122 of butane and heavier alkanes is introduced in the reflux to demethanizer 120 to inhibit solids formation. A vapor stream 124 is removed as a fuel gas product. The bottoms from demethanizer 220 are withdrawn via stream 126 for reflux and/or recycle as previously mentioned. Bottoms product stream 108 from the $CO_2$ stripping column 102 is fed to depropanizer tower 128 wherein $C_3$ rich overhead gas is condensed and a portion of the liquid product is taken off as LPG product stream 130. A butane and heavier hydrocarbon rich bottoms stream 132 is withdrawn and recycled as needed in the stream 104. Excess lean oil from the streams 226 and 132 is taken off as NGL product stream 134.

U.S. Pat. No. 4,370,156 to Goddin, Jr. et al. describes a process for separating relatively pure fractions of methane and carbon dioxide from gas mixtures, wherein a lean oil is used as an absorbent and to prevent solids and azeotrope formation.

U.S. Pat. No. 4,595,404 to Ozero et al. describes a process for regeneration of a $CO_2$ gaseous stream by low temperature distillation wherein the $CO_2$ can be obtained as a liquid side draw from the distillation column.

U.S. Pat. No. 3,058,893 to Cahn et al. describes a distillation arrangement, wherein the separation process of two individual distillation columns is combined into a single distillation column.

U.S. Pat. No. 4,419,188 to McCall describes an extractive distillation process wherein the distillation columns are thermally coupled, that is, two or more columns share a condenser and/or reboiler which can be a discrete piece of equipment or a tray in one column or the other.

SUMMARY OF THE INVENTION

It has been found that distributive distillation can enhance energy and capital cost savings in a $CO_2$ recovery process. The present distributive unit includes a distributor zone, to separate lighter and heavier hydrocarbon components and distribute carbon dioxide between the overhead and bottoms streams, and concentrating zones, to concentrate the $CO_2$ in the distributed streams into purified product streams. Economics can be improved by placing at least one section of each of the concentrating zones in a single concentrating column; producing a $CO_2$ product stream as a side draw stream; using an open cycle heat pump; thermally coupling the distributive and concentrating columns; and/or physically integrating the distributive and concentrating columns.

The present invention provides a process for recovering $CO_2$ from a mixture of light hydrocarbons. As one step, the mixture is fed to a distributive distillation zone at a subcritical pressure to distill the mixture into a $CO_2$ containing overheads stream enriched in methane, and a $CO_2$ containing bottoms stream enriched in propane and heavier hydrocarbons (collectively referred to hereafter as heavier hydrocarbons). At least a portion of the overheads stream from the distributive zone is fed to a first $CO_2$ concentrating distillation zone. The bottoms stream from the distributive zone is fed to a second $CO_2$ concentrating distillation zone. A first $CO_2$ concentrated stream is withdrawn from the stripping section of the first concentrating zone below the feed point. A second $CO_2$ concentrated stream is withdrawn from the enriching section of the second concentrating zone above the feed point. A lean oil stream is preferably refluxed to the enriching section of the second concentrating zone. A $CO_2$-lean methane enriched overhead stream and a $CO_2$-lean propane and heavier hydrocarbons bottoms stream are obtained from the respective first and second concentrating zones, above and below the respective feed points.

The process can include the optional step of further purifying the methane enriched stream from the first concentrating zone, for example, in a demethanizer column which yields a high purity methane product overhead and a bottoms stream which can be recycled to the enriching section of the second concentrating zone.

The process can also include the optional step of distilling the bottoms stream from the heavier hydrocarbons concentrating zone, for example, in a depropanizer column which yields a liquefied petroleum gas (LPG) overhead stream and a lean oil bottoms product, a portion of which can be used for the lean oil reflux stream fed to an enriching section of the second concentrating zone, and/or in the reflux of the optional demethanizer column.

In one preferred embodiment, at least one section from each of the concentrating zones are disposed in the same concentrator column, preferably with the first concentrating zone positioned as an upper zone above a lower second concentrating zone. The $CO_2$ product stream(s) can be taken as a side draw from either a lower end of the upper zone stripping section or an upper end of the lower zone enriching section, or both. The upper and lower zones can optionally be in fluid communication with each other adjacent the side draw streams, sharing a common lowermost and uppermost respective tray, for example. In this manner vapor $CO_2$ product can be taken as a side draw from the uppermost tray of the lower zone; liquid $CO_2$ product can be taken as a side draw from the lowermost tray of the upper zone.

In another preferred embodiment, the process includes compressing vapor from the stripping section of the first concentrating zone for heating the second concentrating zone in an open cycle heat pump. Preferably, the rectifying section of the first concentrating zone is operated at a higher subcritical pressure than the stripping section of the same zone, and a vapor stream from the stripping section of the first concentrating zone is compressed and passed in heat exchange with the second concentrating zone, e.g. in a side reboiler, in heat exchange with the feed to the second concentrating zone from the distributive zone, to heat the second concentrating zone and cool the compressed vapor stream. The cooled, compressed vapor stream is fed to the high pressure rectifying section of the first concentrating zone, and fluid from the rectifying section is expanded for recycle to the stripping section of the first concentrating zone.

In another preferred embodiment, the distributive zone is thermally coupled with one or both of the concentrating zones, i.e., the thermally coupled zones share a condenser, reboiler, or both. Overhead vapors from the distributive zone and the first concentrating zone, preferably from the stripping section of the first concentrating zone, can be condensed and refluxed by a common condenser. Similarly, bottoms liquid from the distributive zone and/or the second concentrating zone, preferably from the stripping section of the second concentrating zone, can be heated in a feboiler which supplies reboil vapor to the distributive zone and the second concentrating zone. Or, the distributive zone can use a tray in the first concentrating zone as a condenser and source of reflux; and/or a tray in the second concentrating zone as a feboil vapor source.

In a further embodiment, the distributive zone can be thermally coupled with concentrating zones in a physically integrated column, for example, using a vertical barrier, such as a flat wall or a concentrically cylindrical wall, to separate the distributive zone from the concentrating zones. The wall preferably has an upper end that divides the first concentrating zone into a rectifying section above the upper end of the wall, and a stripping section below the upper end of the wall. The wall preferably has a lower end that divides the second concentrating zone into an enriching section above the lower end of the wall, and a stripping section below the lower end of the wall. In other words, the distributive zone is separated by the wall from the stripping section of the first concentrating zone and from the enriching section of the second concentrating zone. The vertical point of fluid communication between the distributive zone and the respective concentrating zones corresponds to the feed points for the respective overheads and bottoms from the distributive zone.

The present process can efficiently recover carbon dioxide from light hydrocarbons without the formation of column-plugging solids or azeotropes, with reduced energy requirements and lower capital costs than the available prior art processes. This result is obtained because the carbon dioxide is partially separated from both the lighter and heavier petroleum gases in the distributive distillation zone. Lower energy requirements and capital costs can also result from combining the overhead streams from the distributive and first $CO_2$ concentrating zones in a single condenser which partially condenses the overheads for reflux to both zones. Similar energy and equipment cost savings can be realized by using a single reboiler to heat and supply reboil vapor to both the distributive zone and the second concentrating zone. In addition, a single compressor stage, typically a fourth stage, can be used to simultaneously compress the fuel gas product and to heat pump one or both of the distributive and concentrating zones. In contrast to the Ryan/Holmes process of FIG. 1 wherein the entire feed stream is contacted with lean oil, the present process substantially eliminates methane/lean oil contact, makes a major reduction in $CO_2$/lean oil contact, and will usually involve lean oil recycle only to enhance the separation of $CO_2$ from the heavier petroleum gases in the second $CO_2$ concentrating zone.

The present invention also provides a $CO_2$ recovery plant useful in the practice of the present process. The plant includes a $CO_2$ distributive zone, and first and second $CO_2$ concentrating zones. The distributive zone is adapted to distribute a mixture of $CO_2$ and light hydrocarbons between overhead and bottoms streams. The first $CO_2$ concentrating zone is adapted to receive the overhead stream from the distributive zone, produce a concentrated $CO_2$ bottom product from a stripping section, and produce a methane-rich product from an enriching section. The second $CO_2$ concentrating zone is adapted to receive the bottoms stream from the distributive zone, produce a concentrated $CO_2$ product overhead from its enriching section, and produce a $CO_2$-lean bottoms product from its stripping section. The plant preferably includes a lean oil feed to the enriching section of the second concentrating zone to enhance separation efficiency. The plant can also include a depropanizer and/or a demethanizer for further purifying the methane product and/or to obtain a source of lean oil for supplying the feed to the second concentrating zone.

DESCRIPTION OF THE INVENTION

The distributive distillation process of the present invention can distill a mixed hydrocarbon stream containing a high concentration of carbon dioxide into suitable hydrocarbon products, and separate the $CO_2$ into a purified product. By initially distributing carbon dioxide into overhead and bottoms streams of a distributive distillation column, the formation of solids and azeotropes is avoided, and energy and capital costs can be reduced in comparison to the prior art.

Figure 2:
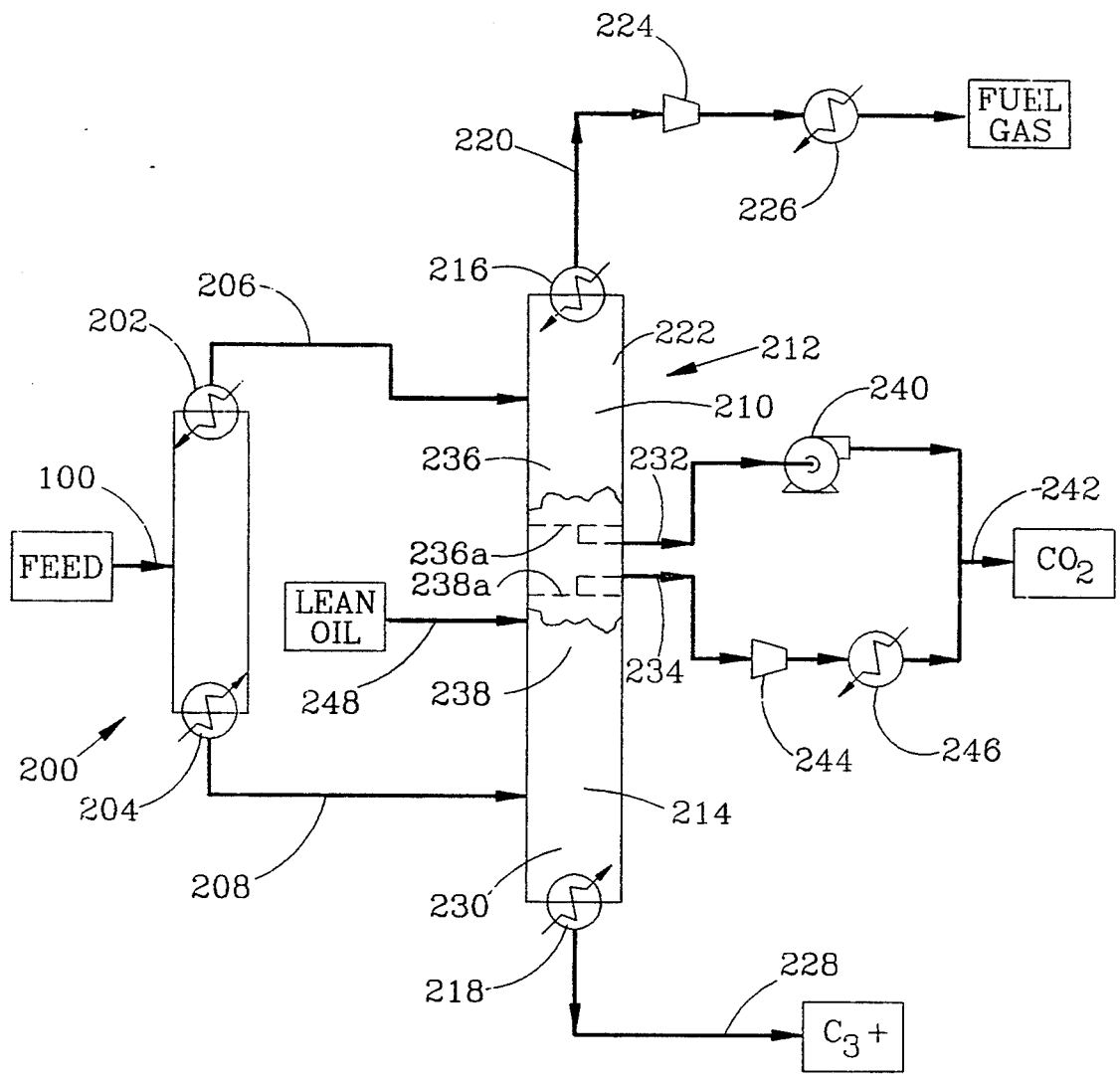
FIG. 2 is a schematic flow diagram of the basic distributive $CO_2$ recovery process of the present invention showing a $CO_2$ distributive distillation column and a $CO_2$ concentrating distillation column wherein a fuel gas product is produced overhead, propane and heavier hydrocarbons are produced as a bottoms product, and $CO_2$ products are produced as vapor and liquid side draw streams.

Referring to the drawings, wherein like reference numerals are used to refer to like parts, a gaseous feed stream 100 can comprise primarily carbon dioxide and methane with minor amounts of ethane, propane, nitrogen and other gaseous components such as hydrogen sulfide, and the like, and heavier hydrocarbons. With particular reference to FIG. 2, the feed stream 100 is introduced under pressure and refrigerated to a temperature typically on the order of $-5°$ C. The feed stream 100 is generally pretreated to remove water by ordinary means, such as, for example, a molecular sieve unit (not shown), to avoid ice formation in the process equipment. The feed stream 100 is fed to a distributive distillation zone in column 200 equipped with condenser 202 and reboiler 204. The column 200 operates at a pressure below the initial pressure of the feed stream, preferably from about 2.0 to about 3.5 MPa (300–510 psia) but any subcritical pressure of from about 1 MPa to about 4 MPa is theoretically possible.

The distributive zone makes a rough separation between a methane-rich stream 106 taken overhead and a propane-rich heavier hydrocarbon bottoms stream 208. The distribution ratio of $CO_2$ and ethane between streams 206 and 208 can each vary from 5:95 to 95:5, and these ratios are variables which can be controlled for energy optimization and/or separation efficiency. The $CO_2$-containing methane rich overhead stream 206 is introduced to an upper concentrating zone 210 in column 212. The $CO_2$-containing heavier hydrocarbon stream 208 is introduced to a lower concentrating zone 214 in column 212. The streams 206 and 208 can be refrigerated, heated, compressed or expanded as appropriate for energy optimization and/or separation efficiency as desired. The column 212 is preferably operated at a pressure similar to that of the column 200, and can be provided with reflux condenser 216 and feboiler 218.

A methane-rich/$CO_2$-lean vapor stream 220 is overhead from rectifying section 222 of the zone 210. The stream 220 can be conventionally compressed and/or refrigerated by compressor 224 and refrigeration unit 226, as desired, and used as a fuel gas or further purified, for example, by perm-selective membrane separation, solvent absorption, or in a conventional demethanizer (see FIG. 4), or the like.

A bottoms product stream 228 is withdrawn from stripping section 230 of the distillation zone 214. The bottoms product stream 228 is relatively lean in $CO_2$ and rich in propane and heavier hydrocarbons, which are collectively referred to herein as "heavier hydrocarbons" for the purposes of simplicity and clarity. The stream 228 can be the ultimate heavier hydrocarbon product, or further processed as desired, for example, by perm-selective membrane separation, solvent absorption, or in a conventional depropanizer (see FIG. 3), or the like, into propane and a lean oil product.

Carbon dioxide product streams 232 and 234 are withdrawn from stripping section 236 of the upper concentrating zone 210 and from enriching section 238 of the lower zone 214, respectively. The $CO_2$ concentrating zones 210 and 214 can be located as desired, but are preferably located in a single column such as column 212, or at least the respective stripping section 236 and enriching section 238 thereof. More preferably, the sections 236 and 238 are in fluid communication such that the lowermost tray 236a is adjacent the uppermost tray 238a of the respective sections. The $CO_2$ stream 232 is thus obtained as a liquid side draw from tray 236a, and/or the $CO_2$ stream 234 as vapor from above tray 238a. The $CO_2$ stream 232 can be pumped by pump 240 into $CO_2$ product line 242. The $CO_2$ vapor stream 234 can similarly be compressed in compressor 244, cooled in refrigeration unit 246, or alternatively thermally compressed in a condenser (not shown; see FIGS. 7 and 8), and fed to $CO_2$ product line 242. Reflux to the enriching section 238 can be a liquid downcomer from the tray 236a, a side stream of liquid stream 232, condensate from tray 238a or stream 234, one or more conventional intercondensers, or the like, or any combination of these sources in accordance with desired energy, separation and capital cost efficiencies.

To enhance the separation of $CO_2$ from the heavier hydrocarbons, a lean oil reflux 248 can be introduced to the concentrating zone 214, preferably to the enriching section 238 thereof, and more preferably in an upper end thereof adjacent the side draw stream 234. The lean oil reflux 248 can be refrigerated to reduce the condensate reflux load, and is generally introduced at about 5 to 10 trays or stages below the side draw stream 234 to minimize solvent loss overhead.

Figure 3:
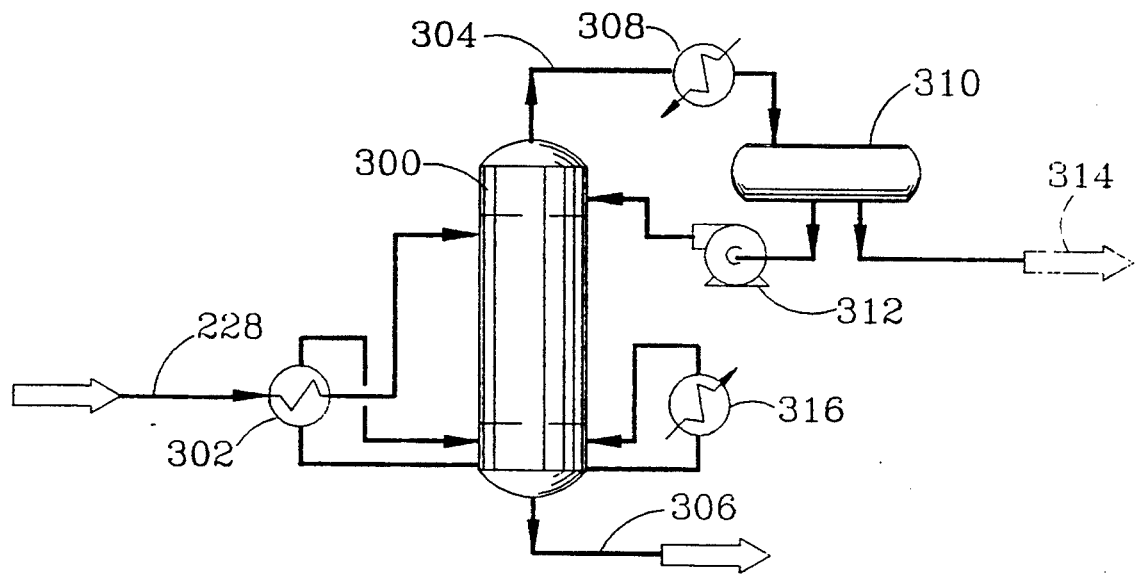
FIG. 3 is a schematic flow diagram of a typical depropanizer which can be used according to the present invention to process the bottoms product from the stripping section of the second concentrating zone, into an LPG product and a lean oil product.

FIG. 3 illustrates a typical depropanizer column 300 which can optionally be used to further process the heavier hydrocarbon stream 228, as previously mentioned. The stream 228 can be cooled in exchanger 302, expanded across a pressure let-down valve (not shown), and fed to depropanizer column 300. The column 300 is preferably operated at a pressure of from about 0.8 to about 1.2 MPa (115–175 psia), such that cooling water can be used in the overhead condenser, although a pressure from subatmospheric up to any subcritical pressure is theoretically possible. A propane-rich stream 304 is obtained overhead and lean oil stream 306 as a bottoms product. The overhead stream 304 is condensed in overhead condenser 308 and condensate is accumulated in accumulator 310. Condensate is refluxed to the column 300 via pump 312 and produced as a liquefied petroleum gas (LPG) product via line 314. Reboil vapor is obtained by circulating liquid from the stripping section of the column 300 through the heat exchanger 302 and reboiler 316. The lean oil stream 306 can be taken off as a product stream, but at least a portion thereof is preferably recycled to the second concentrating zone via line 248 (see FIG. 2) and/or the optional demethanizer (see FIG. 4).

Figure 4:
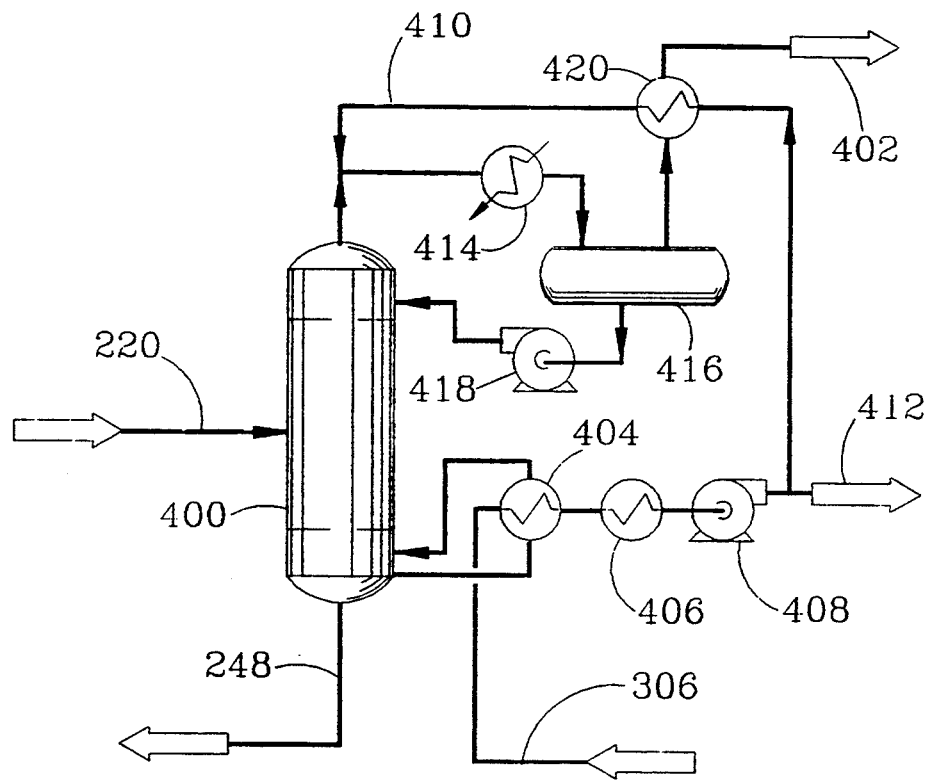
FIG. 4 is a schematic flow diagram of a typical demethanizer which can be used according to the present invention to further purify the enriched methane stream from the rectifying section of the first $CO_2$ concentrating zone.

A typical demethanizer column 400 is seen in FIG. 4 for optional distillation of the methane-rich stream 220 into high-purity methane product stream 402, and a bottoms stream 248 containing residual $CO_2$ and the heavier hydrocarbons, including any lean oil absorbent, which can be recycled to the enriching section 238 as mentioned above. The stream 306 from the depropanizer 300 can be used as a source of heat for reboiler 404; and also as a source of reflux in the demethanizer 400 to enhance separation efficiency. The stream 306 is typically cooled in heat exchanger 406 and pumped via pump 408 into overhead line 410. Lean oil which is not recycled can be taken off in product line 412. Overheads from the demethanizer 400 mixed with the lean oil in line 410 are partially condensed in heat exchanger 414, and the resulting condensate/lean oil mixture is collected in accumulator 416 for reflux to the demethanizer 400 via pump 418. Vapor from the accumulator 416 can be heated and used to cool the lean oil absorbent via heat exchanger 420 before discharge in product stream 402.

Figure 5:
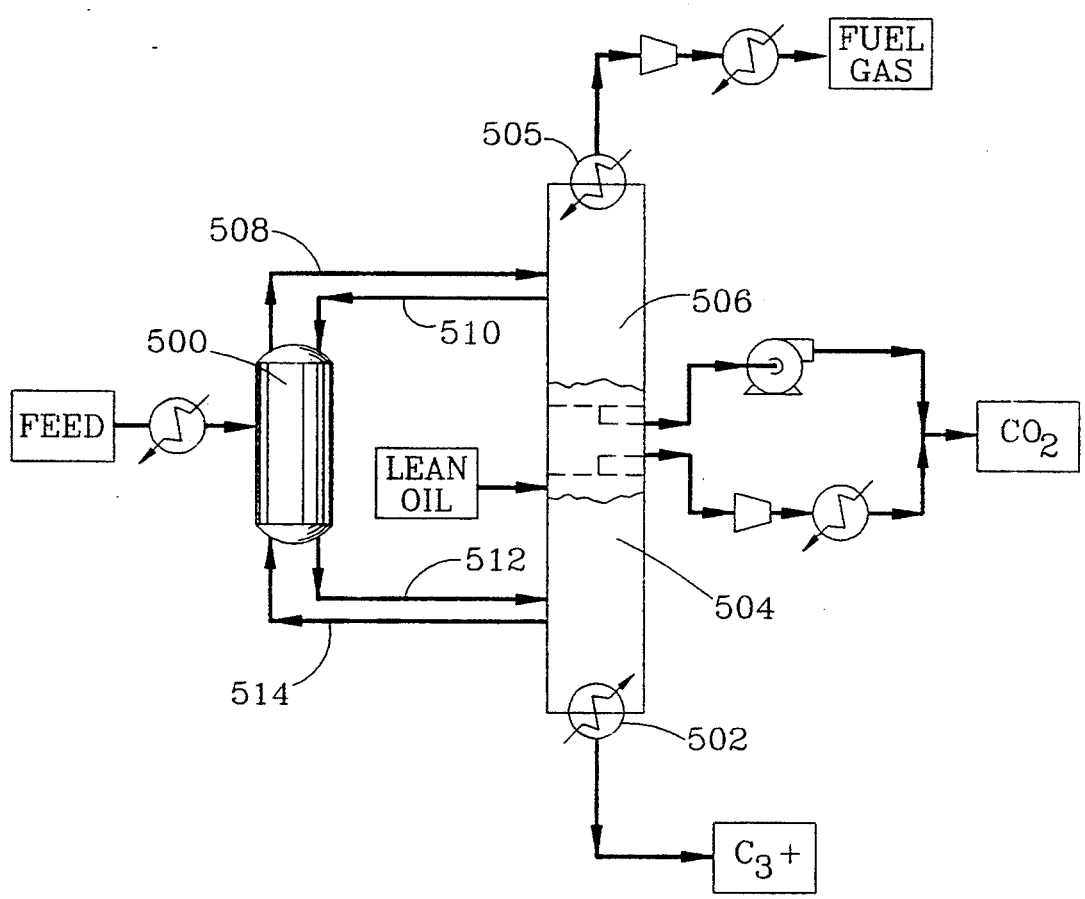
FIG. 5 is a schematic flow diagram of a distributive recovery process of the present invention illustrating thermal coupling of the distributive zone with each of the concentrating zones.

In a preferred embodiment, the distributive zone and one or both of the concentrating zones are thermally coupled, i.e. the zones share a reboiler and/or condenser, directly or indirectly. For example, in the distributive distillation process seen in FIG. 5, the distributive zone 500 can be heated by common reboiler 502 with the lower concentrating zone 504, and cooled by common condenser 505 with the upper concentrating zone 506. This can be effected by sending overhead vapors from the distributive distillation zone 500 via line 508 to condenser 504 together with overhead vapors from concentrating zone 506. The vapor in line 508 is introduced to the concentrating zone 506, where it is mixed with vapors rising upwardly in the zone 506. Similarly, condensate from the reflux condenser 505 can be returned to the concentrating zone 506 and the distributive zone 500 by taking liquid from the concentrating zone 506 via line 510 for reflux to the distributive zone 500.

An analogous thermal coupling can be obtained between the distributive zone 500 and the lower concentrating zone 504 by using the common reboiler 502. Liquid from the distributive zone 500 is introduced via line 512 to an upper portion of the stripping section of the concentrating zone 504 for heating, in admixture with the liquid flowing downwardly in the zone 504, in the reboiler 502. Vapor is returned from the concentrating zone 504 to the distributive zone 500 via line 514.

Thermal coupling has the economic advantage of eliminating a condenser and/or feboiler, and can simplify operation of the process.

Figure 6:
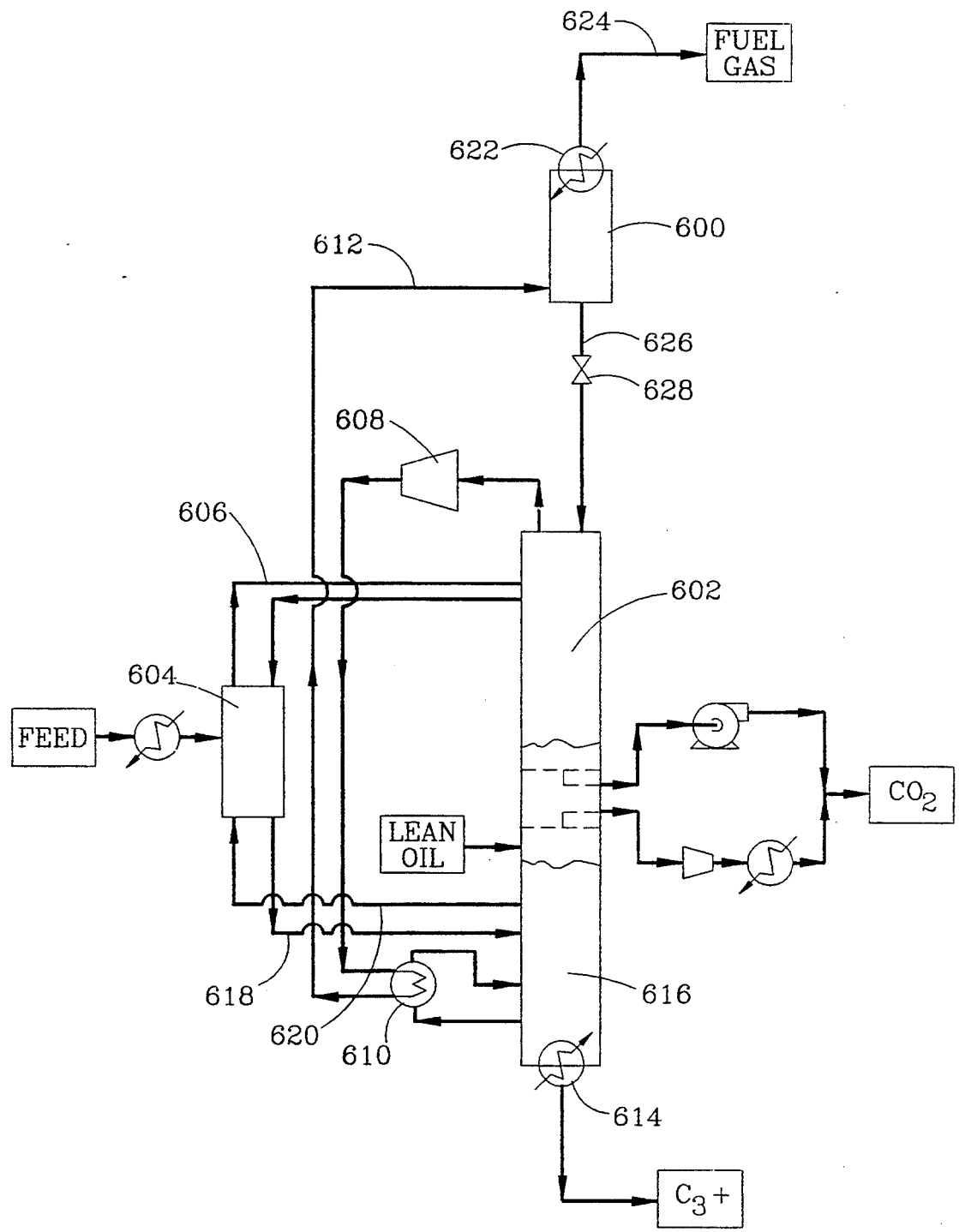
FIG. 6 is a schematic flow diagram of the thermally coupled distributive recovery process of FIG. 5 modified to include elevated pressure operation of the rectifying section of the first $CO_2$ concentrating zone and an open cycle heat pump.

Another improvement scheme in the present distributive distillation process includes the use of an open cycle heat pump of compressed vapor from the first $CO_2$ concentrating zone against the second $CO_2$ concentrating zone. In one embodiment seen in FIG. 6, at least a part of the rectifying section 600 of the first concentrating zone is operated at an elevated pressure with respect to the stripping section 602. Overhead vapor from the distributive zone 604 is introduced via line 606 adjacent an upper end of the stripping section 602, or otherwise combined with overhead vapor from the stripping section 602, to be compressed by compressor 608, cooled in side reboiler 610, and fed to a lower end of the high pressure portion of the rectifying section 600 via line 612.

The side reboiler 610 serves to supplement a primary reboiler 614 for the heating of a second $CO_2$ concentrating zone 616. The reboilers 610 and 614 thermally couple distributive zone 604 and concentrating zone 616 through bottoms feed line 610 and vapor return line 620. The high pressure rectifying section 600 of the first concentrating zone is equipped with an overhead reflux condenser 622 and yields an overhead fuel gas stream 624 which can be further processed as described above. Bottoms stream 626 is expanded across valve 628 to the pressure of the stripping section 602. Liquid from an upper end of the stripping section 602 (or directly from line 626 after expansion) is returned to reflux the distributive zone 604 to complete the thermal coupling.

The side reboiler 610 is positioned so that the upstream temperature in line 612 is sufficiently higher than fluid of the zone 616 for efficient heat exchange, preferably with fluid at or below the feed point of line 618, i.e. in the stripping section of the zone 616. This open cycle heat pump achieves further energy savings. The heat pump embodiment can be practiced with or without thermal coupling.

Figure 7:
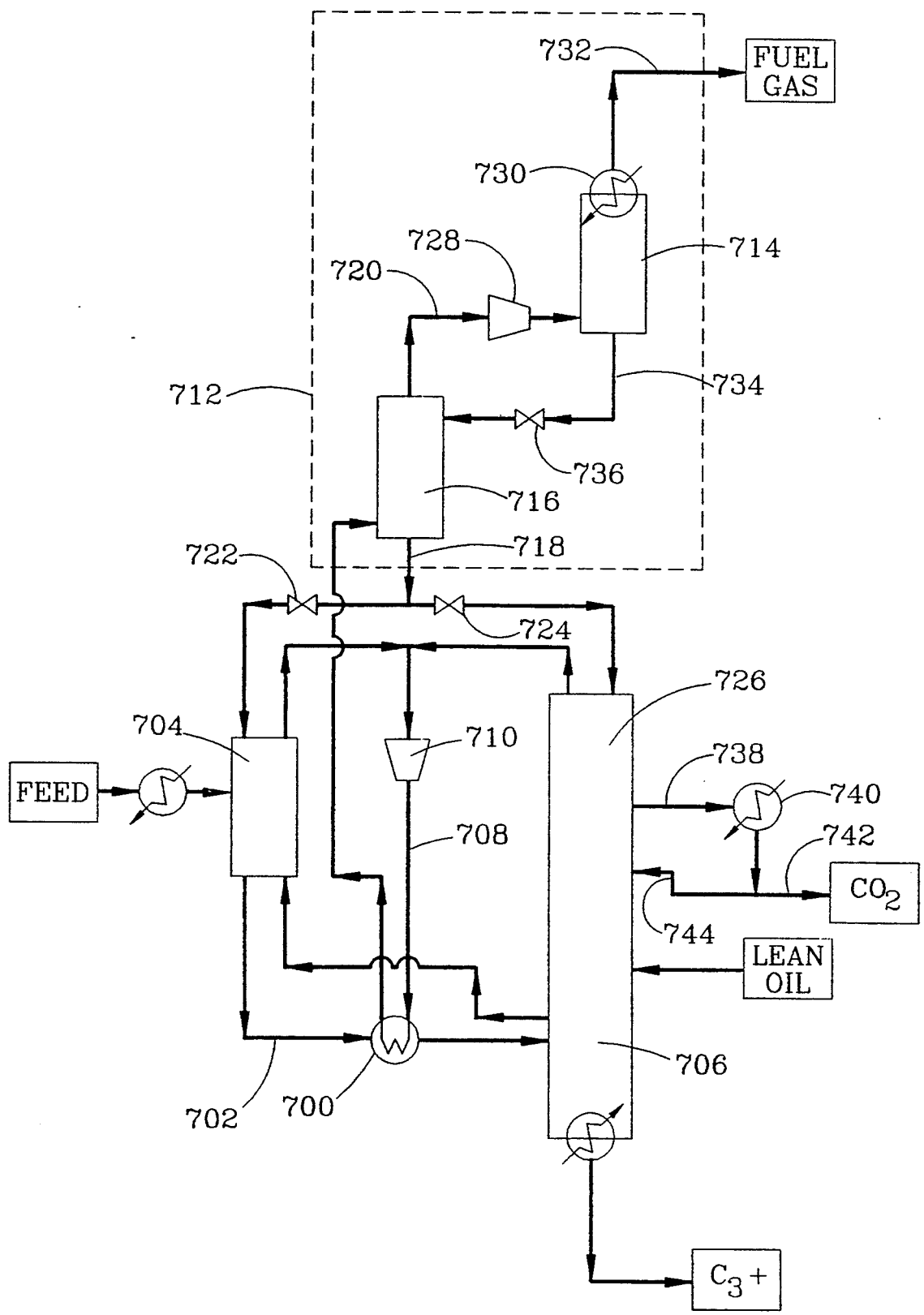
FIG. 7 is a schematic flow diagram of the present distributive distillation process showing heat pumping of compressed vapors of the first concentrating zone in heat exchange with the feed to the second concentrating zone, and staged pressure operation of the rectifying section of the first concentrating zone.

The open cycle heat pump can also be effected by placing heat exchanger 700 in bottoms feed line 702, from the distributive zone 704 to the second concentrating zone 706, as seen in Fig- 7. This has the advantage of using a compressed vapor stream 708 having a relatively lower temperature. In turn, this has the substantial economic advantage of requiring less energy consumption by compressor 710 since the required temperature can be obtained with less compression.

FIG. 7 also illustrates one example of staged rectifying section 712 including a high pressure separation zone 714 and a reduced or intermediate pressure separation zone 716. Cooled feed from the exchanger 700 is introduced to the zone 716 which can include one or more distillation stages to produce a liquid bottoms stream 718 and a vapor overhead stream 20. The bottoms stream 718 is divided and expanded across valves 722, 724 for reflux to the distributive zone 704 and stripping section 726, respectively. The overhead stream 720 is compressed in compressor 728 and introduced to the high pressure zone 714 which can include one or more distillation stages and conventional reflux condenser 730 to produce a methane enriched overhead stream 732 and a liquid bottoms stream 734. The stream 734 can be expanded across introduced as reflux to the intermediate zone 716. Additional separation stages at higher pressure can also be used, as desired.

FIG. 7 also illustrates a single side draw 738 of $CO_2$ vapor wherein the liquid $CO_2$ coming down from the stripping section 726 is introduced to the rectifying section of the second distillation zone 706 as reflux. The vapor stream 738 is cooled in condenser 740 (or otherwise compressed) and obtained in $CO_2$ product stream 742. Additional reflux, if needed, can be returned via line 744; similarly, excess reflux from the section 726 can be taken off as a liquid side draw (not shown).

Figure 8:
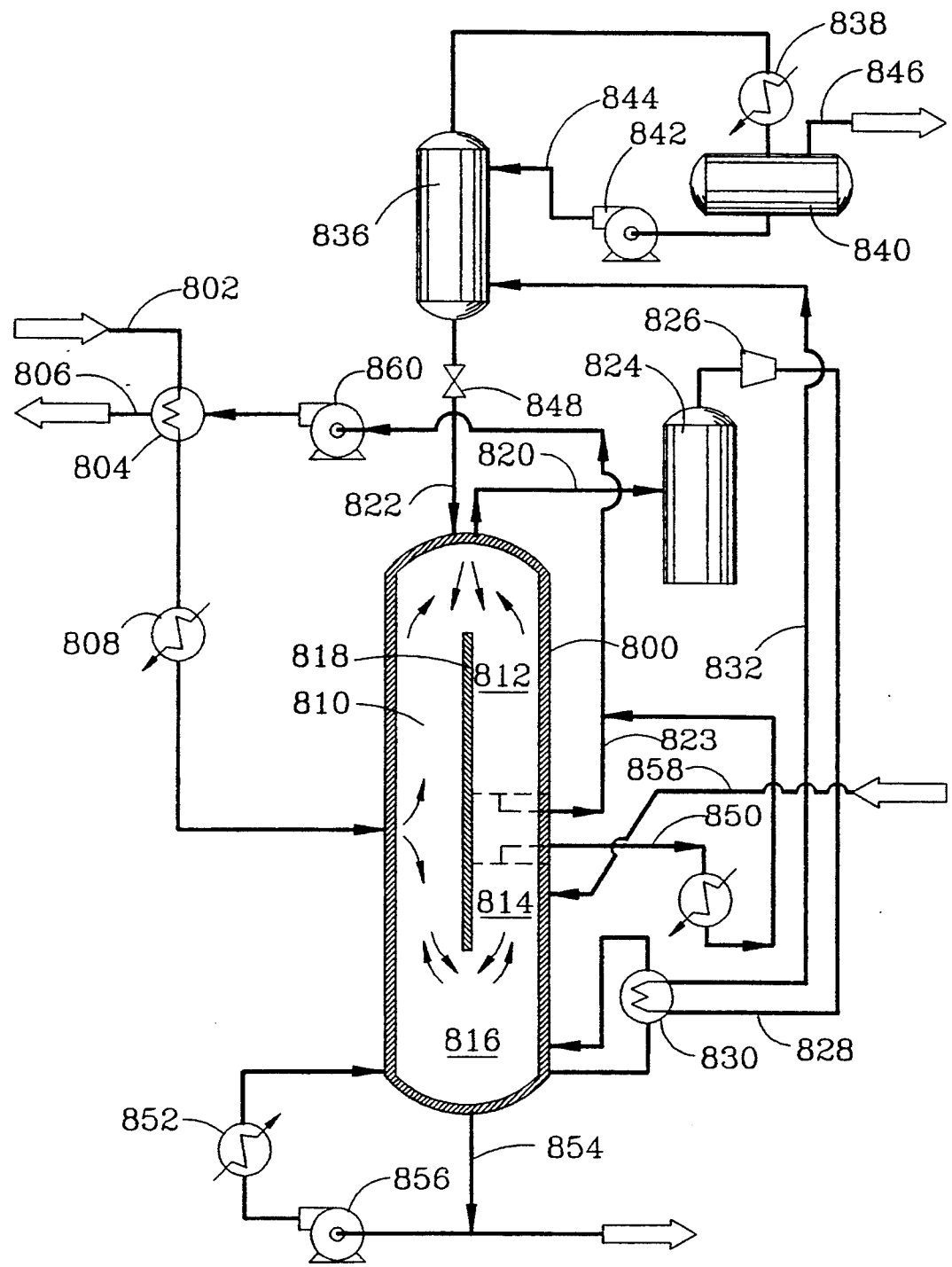
FIG. 8 is a schematic flow diagram of a distributive $CO_2$ recovery process modified to include physical integration of thermally coupled distributive and concentrating zones into the same column, elevated pressure operation of the rectifying section of the first $CO_2$ concentrating zone, and open cycle heat pump of the second $CO_2$ concentrating zone.

A preferred embodiment which includes a physically integrated column 800, as well as thermal coupling and heat pumping, is seen in FIG. 8. The anhydrous gaseous feed stream 802 is introduced under pressure and cooled in heat exchanger 804 against $CO_2$ rich product stream 806, and in refrigeration cooler one to a temperature of about $-5°$ C. The cooled feed gas is directed to a $CO_2$ distributive zone 810 of column 800, preferably operated at a pressure of from about 2.0 to about 3.5 MPa (g) (300–510 psig).

The column 800 in this embodiment conveniently combines the distributive zone 810, in a single column, with the stripping section 812 of the first $CO_2$ concentrating zone, and the enriching section 814 and stripping section 816 of the second $CO_2$ concentrating zone. The column 800 is partially partitioned vertically by wall 818 separating the distributive zone 810, on one side thereof, from the stripping section 812 and enriching section 914 on an opposite side thereof. The wall which can be flat, curved or otherwise configured, generally prevents mixing of fluids between the distributive and concentrating zones, except at above upper and below lower ends of the wall 818 wherein the distributive and concentrating zones are in fluid communication for thermal coupling. Each distillation zone 810 and section 812, 814, and 816, of the thermally coupled and integrated column 800 contains internal vapor/liquid contacting devices, for example, packing shapes, trays, or a combination thereof, which are conventional in the art.

The cooled feed stream 802 is introduced to the distributive zone 810 wherein $CO_2$ is distributed between methane enriched vapor discharged from an upper end of the zone 810, and heavier hydrocarbon enriched liquid discharged below the zone 810. The discharged vapor from the distributive zone mixes with the vapor above the stripping section 812, in a region of fluid communication above the upper end of the wall 815. The vapors are collectively withdrawn in line 820, and reflux is returned via line 822 to thermally couple the distributive zone 810 with stripping section 812. The reflux liquid is appropriately distributed over the zone 810 and section 812 by a conventional distributing device (not shown). The stripping section 812 reduces the hydrocarbon content and produces a liquid $CO_2$ rich side draw stream 823 at a take-off point at a lower end thereof.

The overhead vapors in line 820 are passed through scrubber pot 824 and compressed by compressor 826 into line 826. The hot, compressed fluid in line 825 is passed through side reboiler 830, and the resulting cooled stream 832 is introduced to the rectifying column 826. The column 836 is provided with overhead partial condenser 838 and accumulator 840 for supplying reflux liquid via pump 842 and line 844. The rectifying column 836 is preferably operated so that the overheads contain methane and from about 25 to about 33 mole percent $CO_2$ to prevent solids formation in the column 836. The condenser 838 is preferably refrigerated to a temperature on the oreder of from abut $-40°$ C. to about $-10°$ C. by heatexchange with a suitable refrigerant, such as propane. Non-condensed vapor from the accumulator 840 can be taken off as a fuel gas product in line 846, and/or further processed, for example, in a demethanizer such as the one seen in FIG. 4. The rectifying column 836 is preferably operated at a pressure from about 5.3 to about 5.7 MPa (770–830 psi), but below the critical pressure. The column 836 is operated at a higher pressure than the column 800, and the bottoms from the column 836 are expanded across valve 848 into line 822 for reflux to the column 800 as mentioned above.

The liquid discharged below the distributive zone 810 mixes in fluid communication with the lower concentrating zone, comprising the sections 814 and 816. The $CO_2$ content is enriched in the enriching section 814 between the lower end of the wall 818 and the take-off point for the $CO_2$ vapor side draw stream 850; the $CO_2$ content is reduced in the stripping section 816 below the lower end of the wall 818. Reboil vapor rising from the stripping section 816 is distributed to the zone 810 and the enriching section 814 on either side of the wall 818 to achieve thermal coupling.

The bulk of the reboiler duty for the column 800 is provided by reboiler 852 through which a portion of the bottoms stream 854 can be circulated via pump 856 or, if desired, the reboiler 852 can operate as a thermosiphon reboiler. Additional reboiler duty can be provided by heat exchange in exchanger 830 against hot, compressed fluid stream 828.

The bottoms stream 854 is enriched in propane and heavier hydrocarbons and contains very little $CO_2$. The stream 854 can be processed, for example, in a depropanizer such as the one illustrated in FIG. 3.

A lean oil stream 858 is preferably introduced to the enriching section 814 as an absorbent to enhance separation of $CO_2$ from propane and heavier hydrocarbons, as previously mentioned. The absorbent oil is preferably introduced to the section well below CO₂ side draw 850 to enhance CO₂ enrichment and the separation of ethane and propane in the stripping section 816.

Condensate from side draw CO₂ stream 850 is preferably combined with CO₂ liquid side draw stream and pumped by a pump 860 through the heat exchanger 804, in line 806, as mentioned earlier, wherein the feed stream 802 is cooled. The CO₂ product stream 806 can be further purified as desired, and/or used in EOR and other applications calling for CO₂.

Overall capital costs and energy consumption in the present process can be reduced by the initial distributive distillation of the feed mixture. Distributive distillation effectively converts a single feed stream to a pair of distributed feeds, relatively crudely separated, one made up of lighter hydrocarbon products and the other of heavier hydrocarbon products. The feed stream thus distributed can be more effectively fractionated in the subsequent CO₂ concentrating distillation zones.

The various improvements specified in the present process result in added savings. Distillation conditions which allow for the thermal coupling of the distributive and concentrating columns eliminate an overhead condenser and a bottoms reboiler, and enable these two columns to be combined into a single unit to eliminate the need for an extra column (and associated costs). The distributive and concentrating columns can share the same reflux condenser and reboiler. The distributive and concentrating columns can be heat pumped by the compressor which is also used to compress the fuel gas product. In addition, the distributive/concentrating distillation column is conveniently set up to remove the CO₂ cut as a side draw.

The present distillation process is further illustrated by reference to the following examples.

EXAMPLE AND COMPARATIVE EXAMPLE

Figure 1:
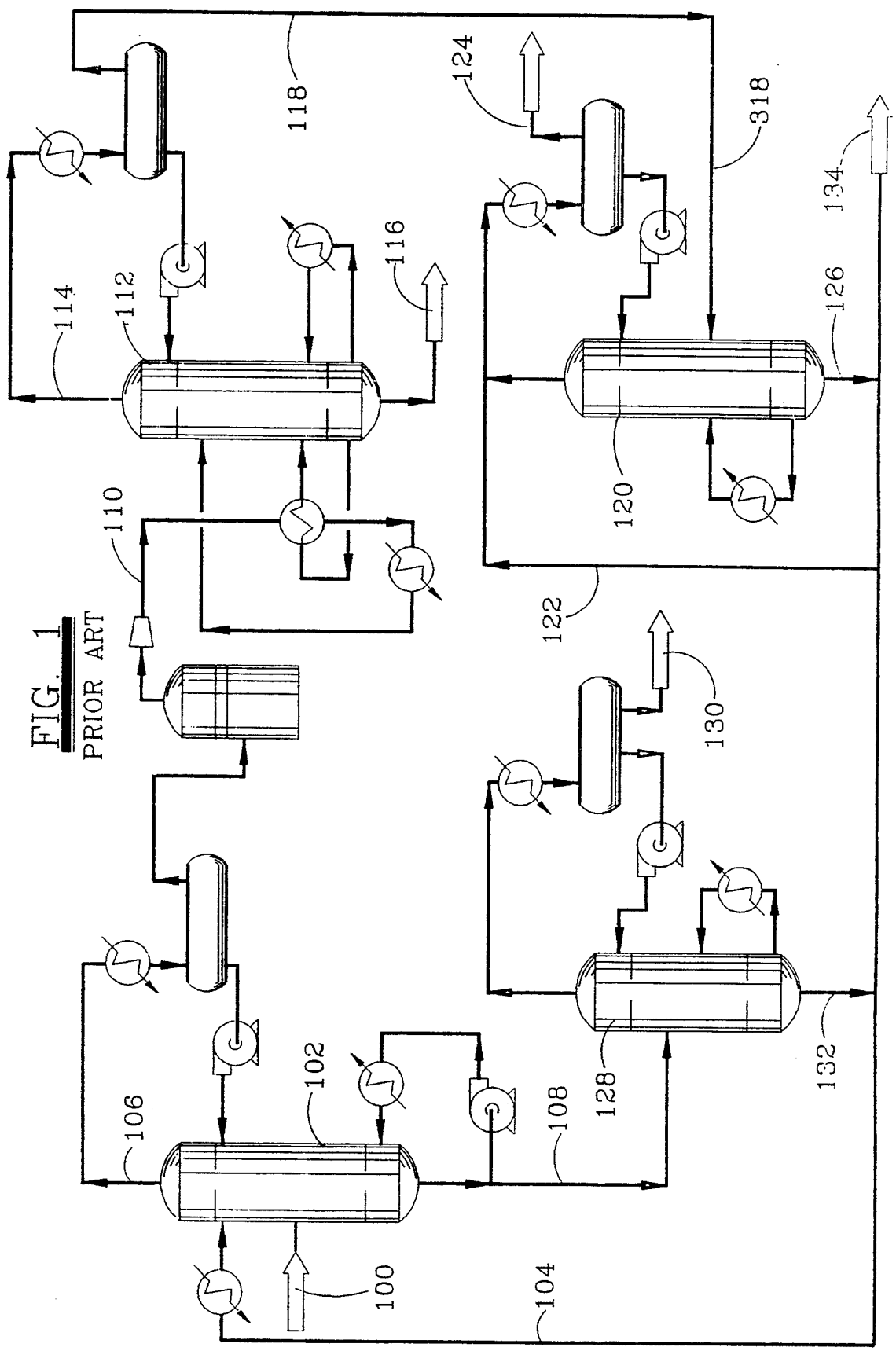
FIG. 1 is a schematic process flow diagram of the prior art Ryan/Holmes process discussed above.

The Ryan-Holmes process as outlined in FIG. 1 (Comparative Example), and the present process as shown in FIG. 8 and including the demethanizer and depropanizer of FIGS. 3 and 4 (Example) are simulated using a commercially available process simulation program generally available in the art. Simulation results are then compared in terms of material balance and economics. Simulations are run using a feed gas composition similar to that in existing oil fields using CO₂ EOR, well after CO₂ breakthrough. The design parameters for the Ryan-Holmes process are obtained using published information. Process simulation design basis is within the ranges given below in Table 1.

TABLE 1

| Feed Gas Conditions | |
|---|---|
| Component | Composition (mol %) |
| Nitrogen | 0.01–0.5 |
| Carbon dioxide | 80–97 |
| Hydrogen sulfide | 0.1–10 ppm |
| Methane | 1–10 |
| Ethane | 0.1–5 |
| Propane | 0.05–3 |
| i-Butane | 0.01–2 |
| n-butane | 0.01–2 |
| i-Pentane | 0.01–2 |
| n-Pentane | 0.01–2 |
| Hexanes | 0.01–2 |
| Heptanes+ | 0.01–2 |
| Total | 100.00 |
| Temperature (°C.) | −10–+40 |
| Pressure (MPa(g)) | 2.0–3.5 |
| Flow rate (Millions of standard cubic meters per day) | 1–5 |

TABLE 1-continued

| Feed Gas Conditions | |
|---|---|
| Component | Composition (mol %) |

If the simulator is not programmed to handle thermally coupled columns combined as one, this process feature can be equivalently handled as two separate but thermally coupled columns. Both process simulations are subjected to detailed pinch analysis for energy optimization. Both simulated processes are found to be highly efficient.

To assure a consistent comparison, the CO₂ recovery rate, the hydrocarbon product flow rate, the product temperature and pressure, as well as the design basis, are kept the same. Upstream processing of the feed gas and downstream processing of the product streams are assumed identical for both the processes so that their costs as determined are comparable. The CO₂ removal process is normally one in a sequence which may include inlet gas compression, H₂S removal, dehydration, LPG treatment and CO₂ recompression.

The energy and utility requirements are calculated for the simulations at simulation design capacity in accordance with the simulation design basis. For the power requirements, all pumps, the process compressor, and the refrigeration compressor are included. The power demand is based on electric motor drives. The typical operating costs include variable costs, maintenance costs, and hydrocarbon losses in the CO₂ product, and are calculated using typical wage and labor overhead costs, and typical values for fuel gas, CO₂, LPG and labor rates.

The simulations show the Comparative Example (Ryan/Holmes) process is comparable in its power requirements when operated at similar pressure relative to the Example (FIG. 8) process, but the present process has about a one-third lower fuel cost because of savings resulting from the use of the thermally coupled column See with heat pumping. Reduction of the power requirements of the present Example process can also be achieved by compressing the vapor from the stripping section for heat exchange with the feed from the distributive zone to the second concentrating zone (see FIG. 7).

Capital cost estimates for the Example process and the Comparative Example process are developed using constant monetary units. The two processes are designed as individual units. Heat transfer coefficients are obtained from actual gas field equipment in similar service. Standard sizing techniques are used for sizing pumps, drums and columns. All equipment costs are estimated using commercially available software well known in the art. The combined distributive/concentrating column 800 is disadvantageously costed as two separate columns. Bulk equipment costs (e.g. piping) are estimated using cost estimating factors for categories of bulk equipment based on materials used and type of construction. The capital cost estimations are estimations of total plant investment including manpower costs such as field costs, home office costs, project contingency, initial chemical charge, startup costs, etc., exclusive of royalties. The upstream and downstream process equipment costs are assumed to be equal for both processes. The total plant investment is presented in Table 2.

TABLE 2

| Cost Type | Facility and plant investment (cost %) | |
|---|---|---|
| | Example | Comparative Example |
| Field cost | 70.2 | 78.3 |
| Home office cost | 8.0 | 8.4 |
| Base plant cost (BPC) | 78.2 | 86.7 |
| Project contingency (25% of BPC) | 19.5 | 21.7 |
| Total facility investment (TFI) | 97.7 | 108.4 |
| Initial charge of chemicals | 0.2 | 0.6 |
| Startup cost | 2.1 | 2.1 |
| Total plant investment (TPI) | 100 | 111.1 |

It can be seen that the capital cost for the Example process of the present invention is about 10% lower than the Comparison Example (Ryan/Holmes) process due to generally smaller equipment size.

The foregoing description of the $CO_2$ removal process is illustrative and explanatory thereof. Various changes in the feed composition, equipment and particular steps employed will occur to those skilled in the art. It is intended that all such variations within the scope and spirit of the appended claims be embraced thereby.

We claim:

1. A process for recovering $CO_2$ from a mixture of light hydrocarbons, comprising the steps of:
    feeding the mixture to a distributive distillation zone to distill the mixture into a $CO_2$ containing overhead stream enriched in methane and a $CO_2$-containing bottoms stream enriched in propane and heavier hydrocarbons;
    feeding the overhead stream from the distributive zone to a first concentrating distillation zone;
    withdrawing a bottoms product $CO_2$ stream from a stripping section of the first concentrating zone;
    obtaining a $CO_2$-lean, methane enriched distillate from a rectifying section of the first concentrating zone;
    feeding the bottoms stream from the distributive zone to a second concentrating distillation zone;
    refluxing a lean oil stream to an enriching section of the second concentrating zone;
    withdrawing a $CO_2$ distillate stream from the enriching section of the second concentrating zone; and
    obtaining a $CO_2$-lean bottoms product from a stripping section of the second concentrating zone.

2. The process of claim 1, further comprising distilling the bottoms product from the second concentrating zone in a depropanizer column into an LPG overhead stream and a lean oil bottoms product.

3. The process of claim 2, wherein a portion of the lean oil bottoms product is used for the lean oil reflux stream to the second concentrating zone.

4. The process of claim 1, comprising further purifying the distillate from the first concentrating zone into a methane enriched product and a residual $CO_2$ product.

5. The process of claim 1, wherein at least the stripping section of the first concentrating zone is disposed in an upper zone above a lower zone comprising at least the enriching section of the second concentrating zone in the same column.

6. The process of claim 5, wherein the $CO_2$ streams are each obtained as a side-draw between the upper and lower concentrating zones.

7. The process of claim 1, including the step of compressing vapor from the first concentrating zone for heat transfer to the second concentrating zone in an open cycle heat pump.

8. The process of claim 7, comprising passing the compressed vapor from the first concentrating zone in heat exchange with the bottoms stream fed to the second concentrating zone.

9. The process of claim 1, wherein the rectifying section of the first concentrating zone is operated at a higher pressure than the stripping section of the same zone, and further comprising the steps of:
    compressing a vapor stream from the stripping section of the first concentrating zone;
    passing the compressed vapor stream in heat exchange to heat the second concentrating zone and cool the compressed vapor stream;
    feeding the cooled, compressed vapor stream to the rectifying section of the first concentrating zone; and
    expanding fluid from the rectifying section for recycle to the stripping section of the first concentrating zone.

10. The process of claim 1, wherein the distributive zone is thermally coupled with one or both of the concentrating zones.

11. The process of claim 1, wherein the distributive zone is thermally coupled with the concentrating zones in a physically integrated column.

12. The process of claim 1, wherein vapors from the distributive zone and the first concentrating zone are condensed and refluxed by a common condenser.

13. The process of claim 1, wherein reboil vapor is supplied to the distributive zone and the second concentrating zone by a common reboiler.

14. A process for recovering $CO_2$ from a mixture of light hydrocarbons, comprising:
    feeding the mixture to a $CO_2$ distributive distillation zone to produce a $CO_2$-containing overhead vapor enriched in methane and a $CO_2$-containing bottoms liquid enriched in propane and heavier hydrocarbons;
    compressing the overhead vapor from the distributive zone and vapor from a stripping section of a first concentrating zone;
    cooling the compressed vapors in heat exchange with a stripping section of a second $CO_2$ concentrating zone;
    feeding the cooled, compressed vapors to the bottom of a rectifying section of the first concentrating zone;
    recovering a methane-rich overhead product from the rectifying section of the first concentrating zone;
    expanding liquid from the rectifying section of the first concentrating zone;
    refluxing the expanded liquid from said rectifying section to the distributive zone and to the stripping section of the first concentrating zone;
    recovering a liquid $CO_2$ bottoms product from the stripping section of the first concentrating zone;
    introducing the bottoms liquid from the distributive zone to an upper part of the stripping section of the second concentrating zone;

introducing a lean oil feed to an upper region of an enriching section of the second $CO_2$ concentrating zone;

recovering a $CO_2$ vapor product from the enriching section of the second concentrating zone above the lean oil feed;

supplying vapor from the stripping section of the second $CO_2$ concentrating zone to a lower region of the distributive zone;

recovering a bottoms product from the stripping section of the second concentrating zone comprising propane and heavier hydrocarbons.

15. The process of claim 14, comprising the further steps of:

feeding the bottoms product from the stripping section of the second concentrating zone to a depropanizer to obtain a liquefied petroleum gas product overhead and a lean oil bottoms product;

in a demethanizer, contacting the methane-rich product from the first concentrating zone with a portion of the lean oil bottoms product from the depropanizer to obtain a high purity methane product overhead and a lean oil bottoms product containing $CO_2$;

recycling the lean oil bottoms product from the demethanizer to said lean oil introduction step to the second $CO_2$ concentrating zone.

16. A $CO_2$ recovery plant, comprising: a $CO_2$ distributive distillation zone adapted to distribute $CO_2$ in a feed stream comprising light hydrocarbons between an overhead stream and a bottoms stream;

a first $CO_2$ concentrating distillation zone, comprising rectifying and stripping sections, adapted to receive the overhead stream from the distributive zone and produce a methane-rich overhead product from the rectifying section and a $CO_2$ bottoms product from the stripping section;

a second $CO_2$ concentrating distillation zone, comprising enriching and stripping sections, adapted to receive the bottoms streams from the distributive zone and produce a $CO_2$-rich product overhead and a bottoms product enriched in propane and heavier hydrocarbons.

17. The $CO_2$ recovery plant of claim 16, comprising a lean oil feed to the enriching section of the second concentrating zone for enhancing $CO_2$ concentration efficiency therein.

18. The $CO_2$ recovery plant of claim 17, comprising a depropanizer adapted to separate the bottoms product from the second concentrating zone into a propane overheads and a lean oil bottoms product.

19. The $CO_2$ recovery plant of claim 18, comprising a demethanizer adapted to contact the methane-rich product from the first $CO_2$ concentrating zone with lean oil from the depropanizer to produce a purified methane product overhead and a lean oil bottoms product.

20. The $CO_2$ recovery plant of claim 19, comprising a line for introducing the lean oil bottoms product from the demethanizer to the enriching section of the second $CO_2$ concentrating zone.

21. The $CO_2$ recovery plant of claim 19, comprising one column housing at least the stripping section of the first concentrating zone above the enriching section of the second concentrating zone, and a side draw take off on the column for the $CO_2$ products from the first and second $CO_2$ concentrating zones.

22. The $CO_2$ recovery plant of claim 16, comprising:

a compressor for compressing vapor from the stripping section of the first concentrating zone at an elevated pressure at which the rectifying section is operated;

a heat exchanger for transferring heat from the compressed vapor to the stripping section of the second concentrating zone;

an expansion valve for expanding liquid from the rectifying section to the stripping section of the first concentrating zone.

* * * * *